INVENTOR:
Kenneth W. Miller
His Patent Attorney

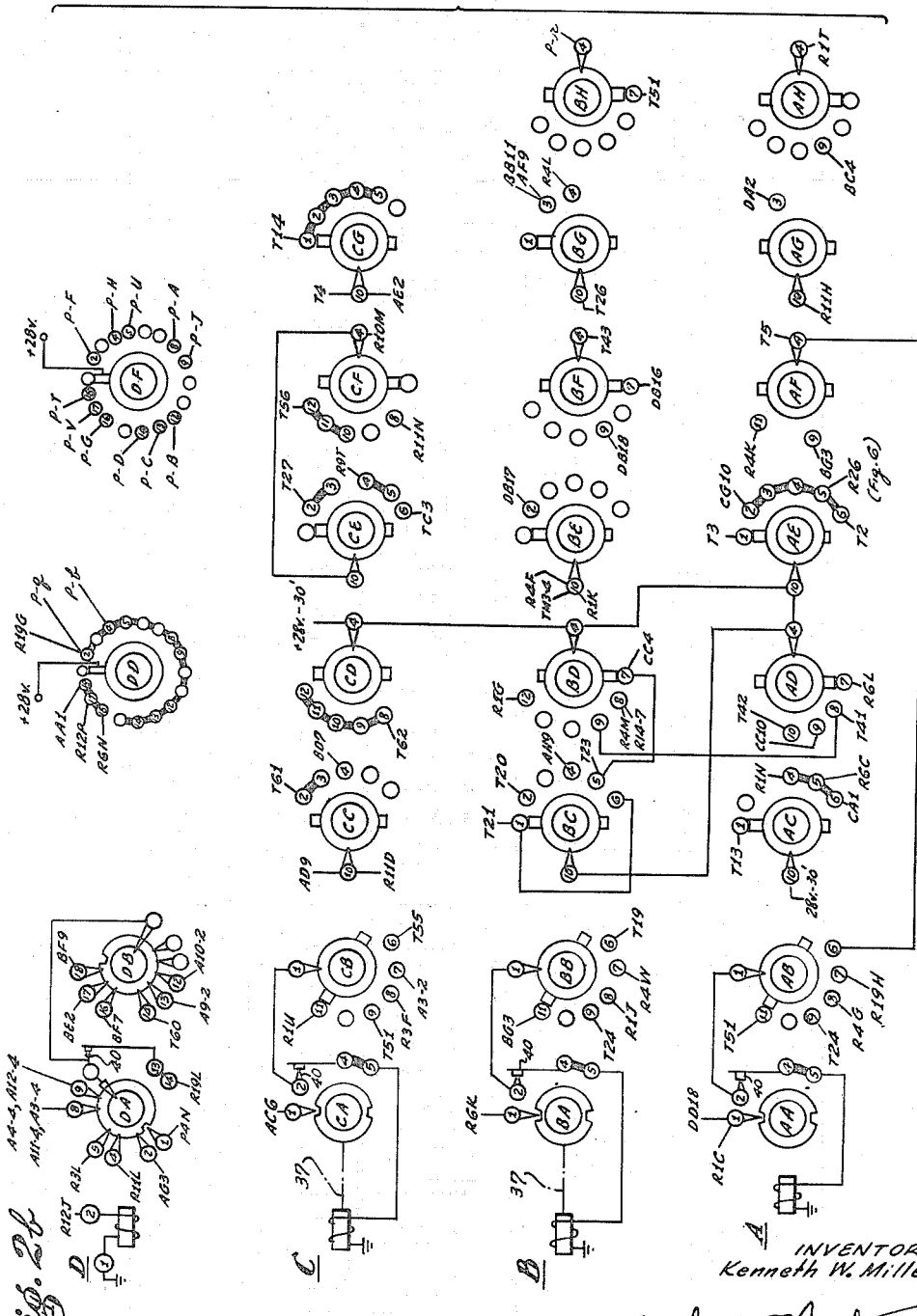

Dec. 30, 1958      K. W. MILLER      2,866,385

AUTOMATIC JET ENGINE STARTING DEVICE

Filed Jan. 10, 1956      12 Sheets-Sheet 4

*Fig. 2C*

INVENTOR:
Kenneth W. Miller
By Herbert E. Metcalf
His Patent Attorneys

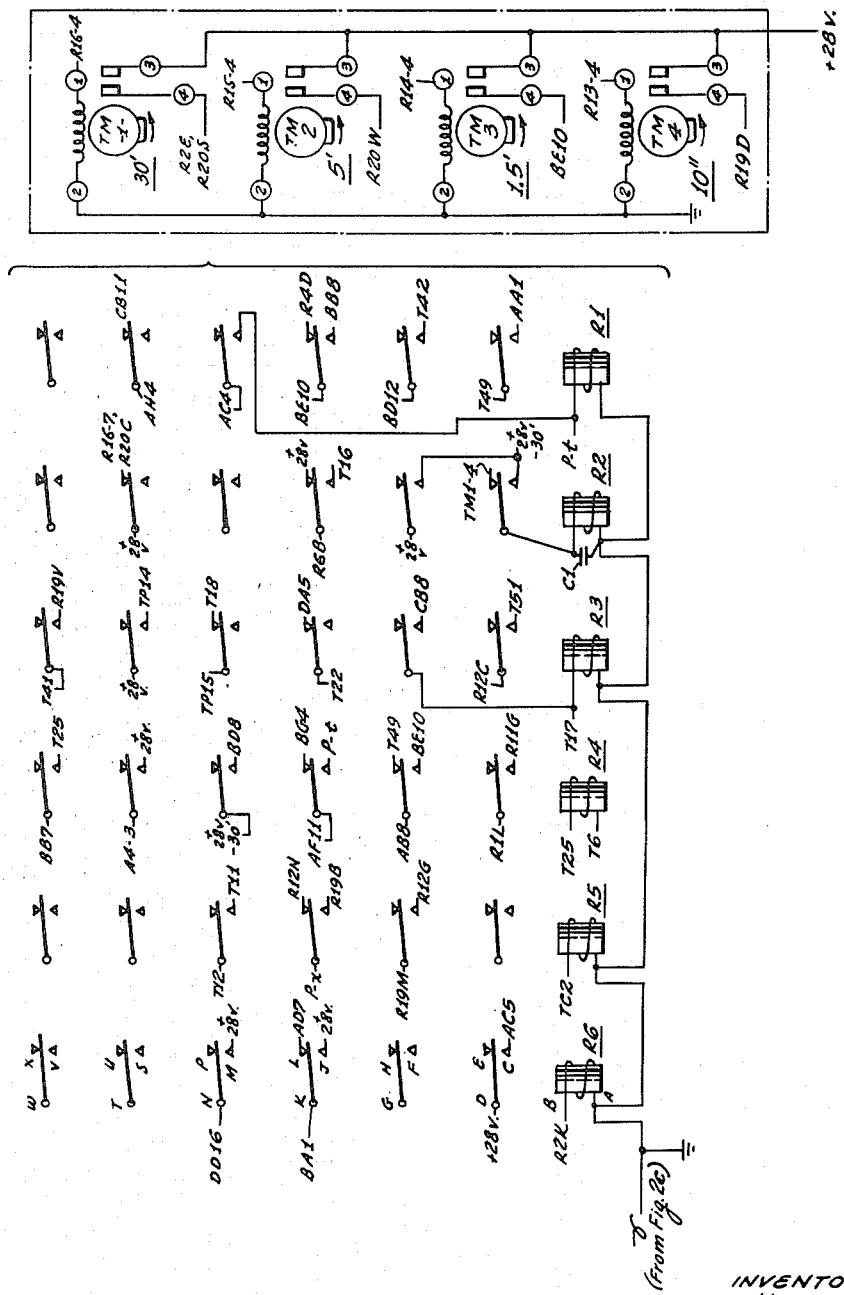

Dec. 30, 1958 K. W. MILLER 2,866,385
AUTOMATIC JET ENGINE STARTING DEVICE
Filed Jan. 10, 1956 12 Sheets-Sheet 6

INVENTOR:
Kenneth W. Miller
By Hubert E. Metcalf
His Patent Attorney

INVENTOR:
Kenneth W. Miller

His Patent Attorney

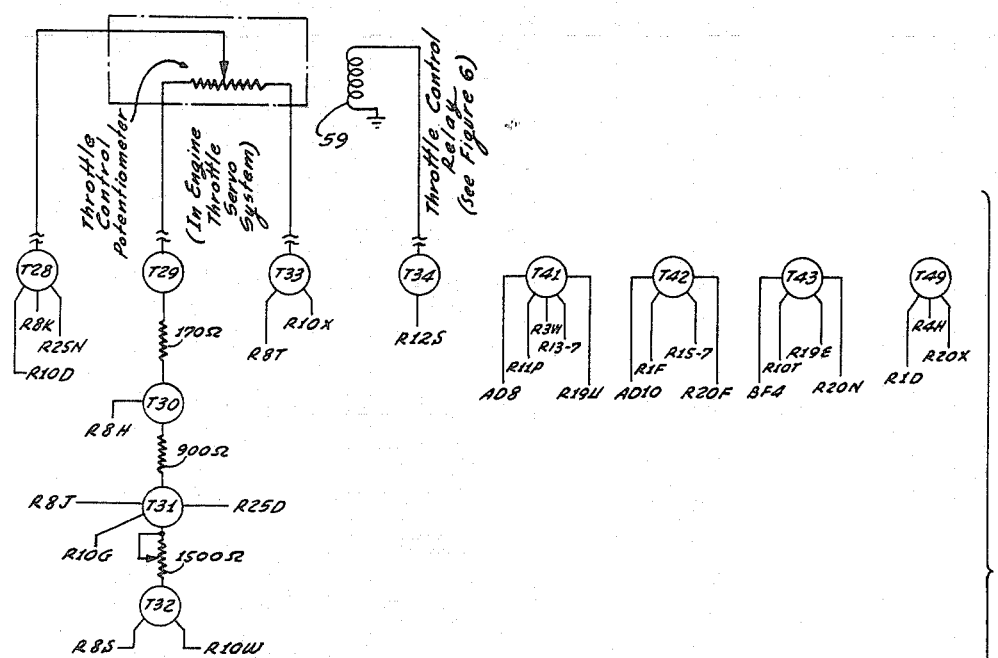
Fig. 2i
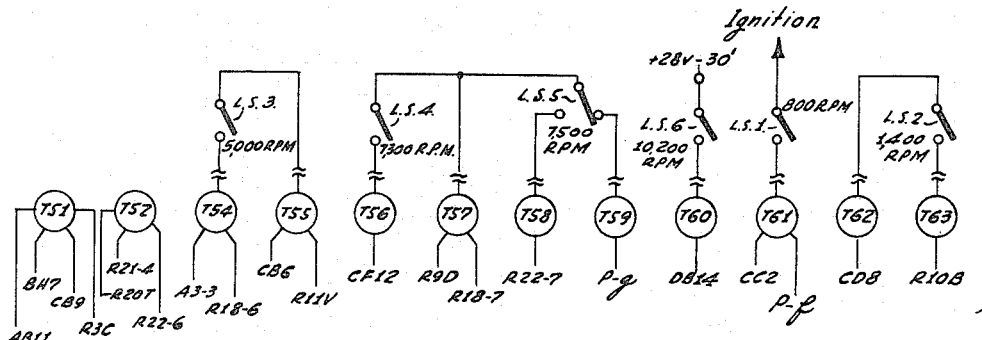
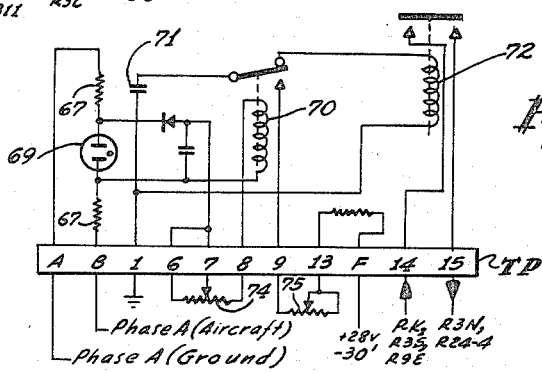
Fig. 2g
INVENTOR:
Kenneth W. Miller
By Herbert E. Metcalf
His Patent Attorney Dec. 30, 1958     K. W. MILLER     2,866,385
AUTOMATIC JET ENGINE STARTING DEVICE
Filed Jan. 10, 1956     12 Sheets-Sheet 9
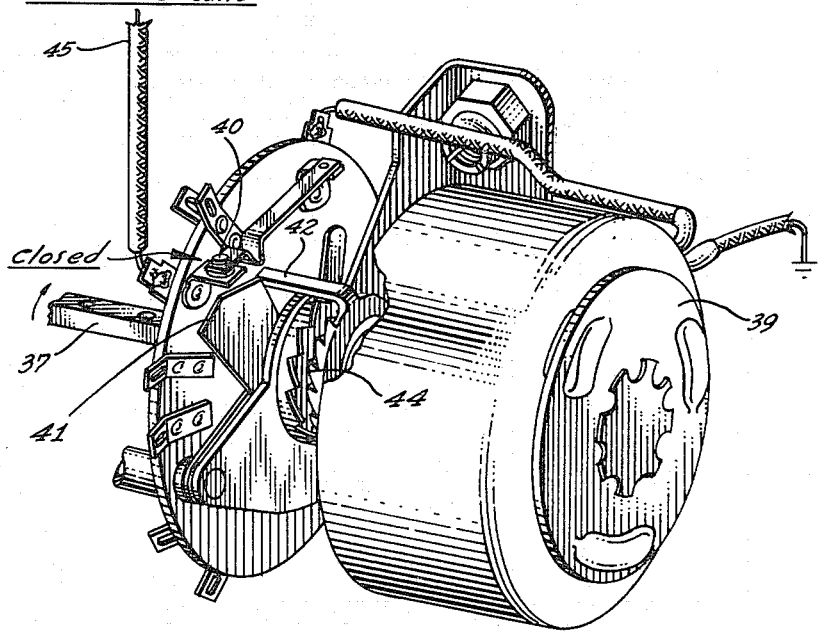
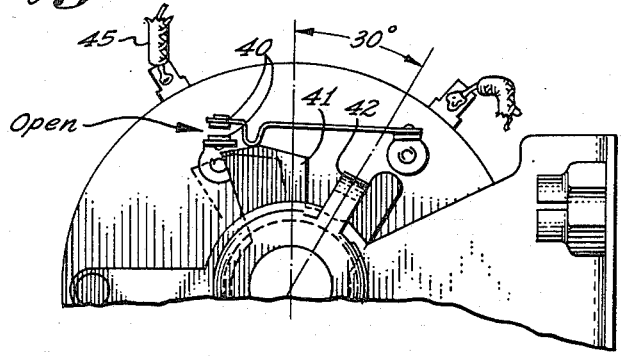
INVENTOR:
Kenneth W. Miller
By Herbert E. Metcalf
His Patent Attorney

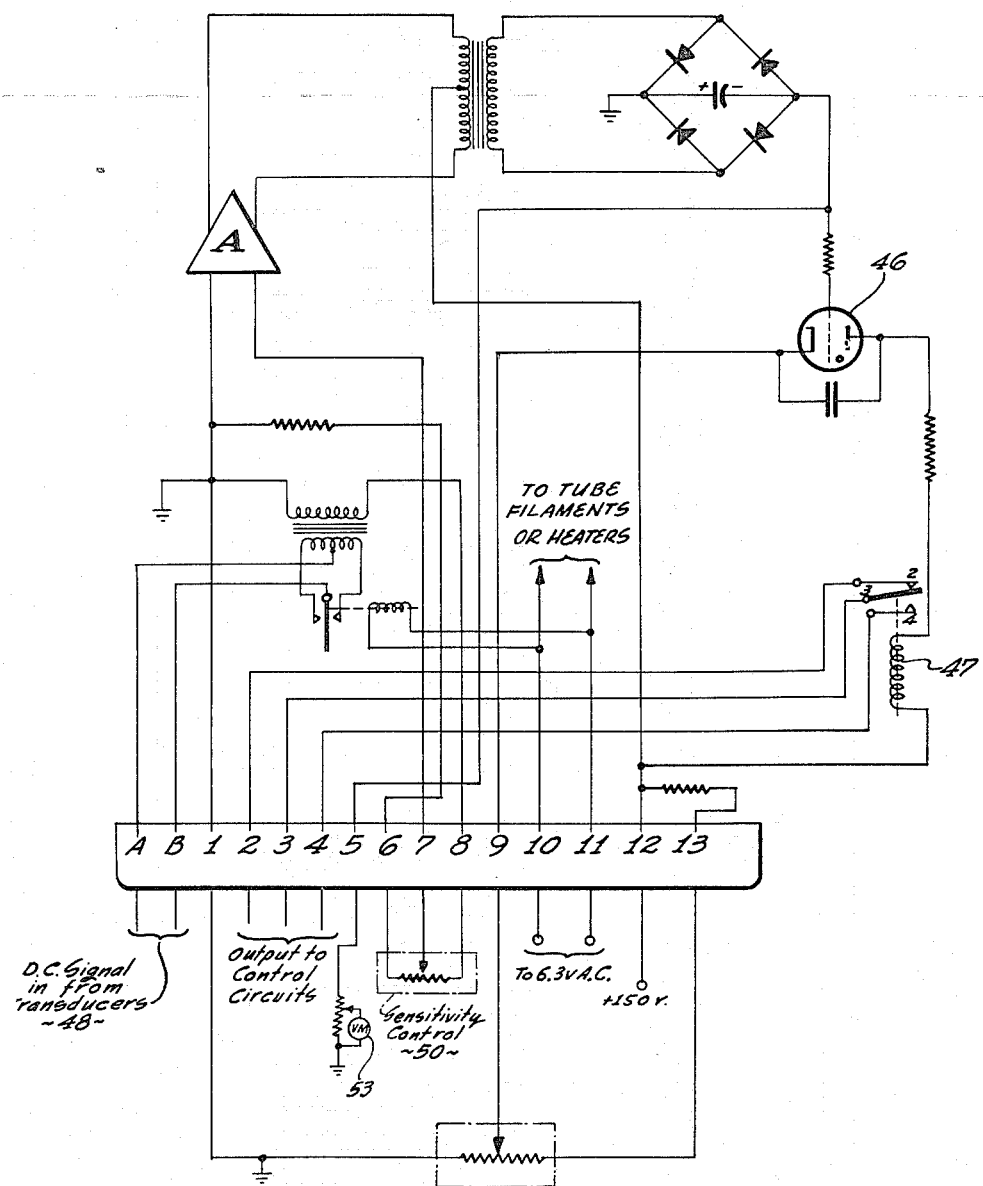

Dec. 30, 1958     K. W. MILLER     2,866,385
AUTOMATIC JET ENGINE STARTING DEVICE
Filed Jan. 10, 1956     12 Sheets-Sheet 11

INVENTOR:
Kenneth W. Miller
By Herbert E. Metcalf
His Patent Attorney

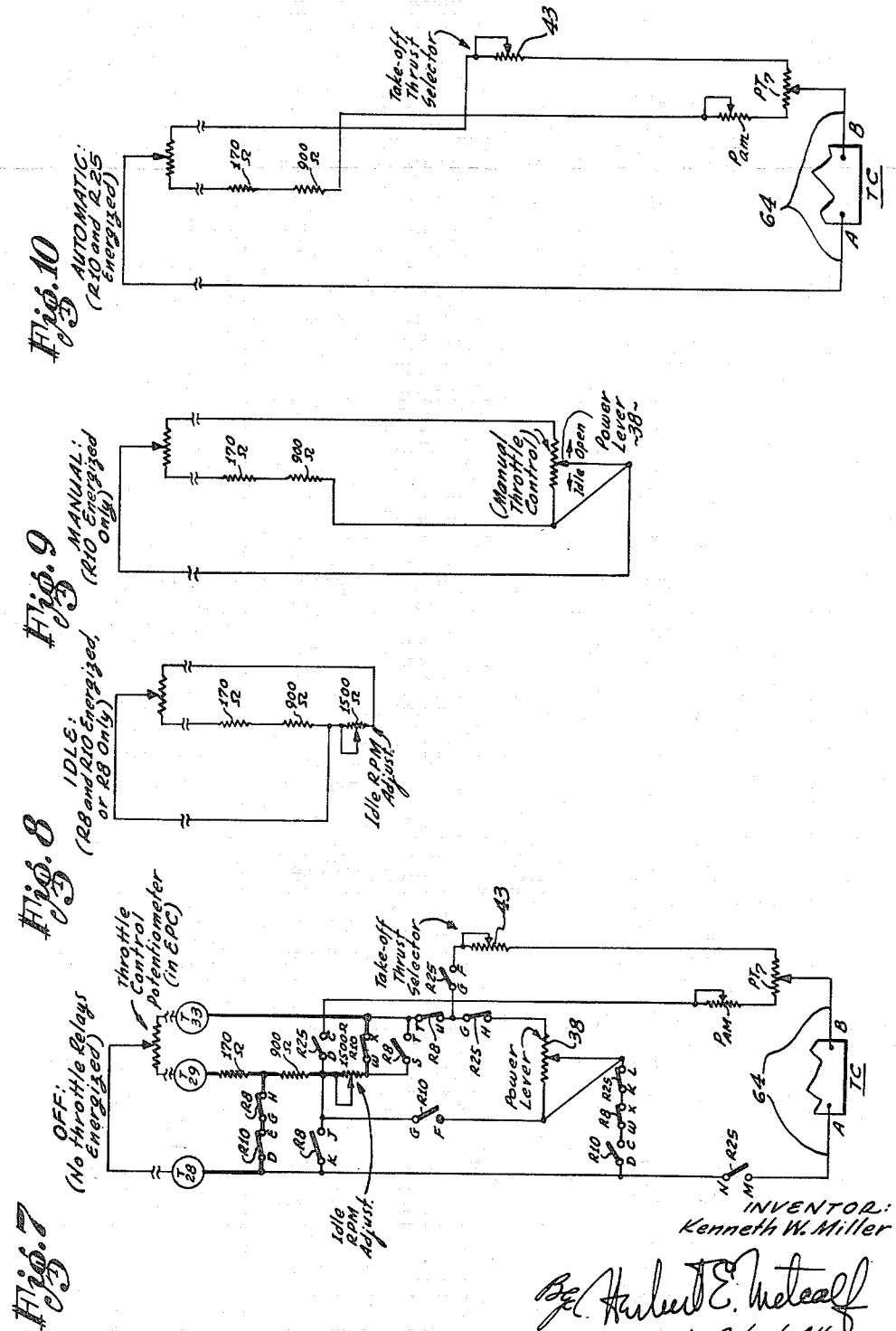

United States Patent Office 2,866,385
Patented Dec. 30, 1958

2,866,385

AUTOMATIC JET ENGINE STARTING DEVICE

Kenneth W. Miller, Granada Hills, Calif., assignor to Northrop Aircraft, Inc., Hawthorne, Calif., a corporation of California Application January 10, 1956, Serial No. 558,234

6 Claims. (Cl. 89—1.7)

The present invention relates to engine operating and test equipment, and more particularly, to automatic starter means for the safe and automatic starting of jet engines.

Gaseous combustion turbine engines are used extensively in modern piloted aircraft and in guided missiles. The effective safe starting of such engines has always been a problem not thoroughly solved, and since many independent factors and components are involved in a complete starting operation, it is difficult to find out quickly what is at fault when a jet engine fails to start, or fails to maintain the required conditions during starting. Many times, the nature of jet engine operation makes the starting procedure dangerous in the event of a malfunction which prevents proper starting. This danger can be both to the engine and/or aircraft, and to personnel, such as when an explosion unexpectedly happens due to accumulated fuel vapors remaining within the engine or tailpipe and being set off by a spark, for example.

It is a broad object of this invention to provide means for automatically and safely starting and stopping a jet engine, including necessary provisions for insuring that all factors are in a safe state before any further action is allowed or initiated by the automatic starting equipment, and for indicating exactly to the operator the status of events at various times.

Thus, it is a further object to set up fast-acting automatic sequence controls which depend on successful completion of step-by-step operations before allowing initiation of the next succeeding step, and which act when a malfunction occurs, to stop the sequence of engine starting steps, or shut off the engine, or cut it back to a previous safe stage, depending upon the nature of the malfunction, thereby giving complete protection to the engine and equipment.

As mentioned above, after fuel has been admitted to the jet engine during a start or aborted start, the possible remaining fuel vapors can be hazardous for a substantial period of time after the engine has actually stopped turning. Accordingly, another object is to cause automatic re-motoring of the jet engine after it has normally stopped, to blow out all residual fuel vapors and render it absolutely safe to approach and enter the engine nacelle, or to re-start.

One important indication in jet engine operation is the tailpipe temperature, which reflects or gives a measure of the exhaust gas temperature and thus an indication of turbine blade temperature. During starting or running under its own power, certain time limits at various maximum allowable temperatures have been established to govern operation, and these must be watched carefully during conventional manual starting and operating procedures, along with other important conditions. This can naturally become a complex situation where human errors can be committed. A specific object of this invention is to include in the starting equipment, automatic temperature running time controls, and equally important, rate of temperature rise controls, for cutting the engine back when any of various temperature limits have been exceeded.

For test the full power operation of a jet engine, the actual produced thrust force is the important governing factor, since a definite but variable take-off thrust must be capable of being reached for a given take-off condition. The engine speed in revolutions per minute (R. P. M.) required to produce a given thrust will vary in accordance with ambient air temperature, humidity, and air pressure, so that thrust calculations or measurements must be made each time that engine run-ups to take-off thrust are made.

Still a further object of the present invention is to provide automatic thrust calculating or determining means in the starting device for indicating when a predetermined thrust has been reached, as called for by the setting of a calibrated, manually variable control member. It is a specific object to provide a special automatic throttle control circuit incorporating this thrust setting means.

Still a further object of the present invention is to provide complete instrumentation on the starter console, of all engine conditions, such as temperatures, speeds, pressures, and the like, while using the minimum number of wires from the engine or craft in which it is installed.

For use with unpiloted vehicles such as target ships, drones, and guided missiles, another object of this invention is to provide means for continuing the engine starting operation up to and through the launching operation, including disconnection of all wiring plugs and equipment, firing of any booster rockets, transferring of external electrical power, fuel supply, etc., and safety features whereby no incorrect or premature procedures can occur at the last moment.

Further specific objects and safety features will be evident from the detailed description forming the main body of this specification, together with the drawings of a preferred apparatus.

Briefly, my invention comprises a plurality of interconnected rotary switches each operated by an electrical stepping relay coil, and each governing the sequence of operation of particular portions of equipment. By connecting relay contacts, timers, signal amplifier outputs, and position-indicating circuits to feed operating voltage to the rotary stepping coils of the switches through individual contact positions of the respective rotary switches themselves, the next immediate position of these switches is automatically attained when the predetermined circuit through the relays, etc., is closed by the previous action of the starter system or engine components. Multiple wafer sections of each rotary switch carry contacts which automatically set up proper circuits through which malfunctions are relayed as electrical signals to initiate correcting or alleviating measures by energizing other relays or by changing rotary switch positions as will be described herein.

The heart of the malfunction detecting circuits comprises a plurality of very sensitive and accurately adjustable signal amplifiers, taking as their inputs the variable voltage outputs of various circuits containing transducers installed in the vehicle and engine and responsive to changes in temperature, pressure, and the like. Output of the amplifiers is by means of a gas tube-controlled relay which is actuated below a desired level of signal input and returned to the non-actuated state above that level. Due to the internal amplifier structure providing a trigger-like action at substantially the same voltage level, whether on increasing or decreasing voltage, the output relay contacts, which are wired between a source of power and the required point in the starter equipment circuit, can close malfunction circuits or give ignition or thrust signals at definite values of the function being measured. Indicating voltmeters are connected to certain of the amplifiers just ahead of the gas tube controlling the relay, to give continuous readings of the measured data on instrument panels.

Time delay relays are used to close and operate some of the malfunction circuits if a selected action is not completed within a designated elapsed time period, such as the opening of a fuel valve. The time delay relays also function, in cooperation with rotary switches, to "remember" what phase of operation is occurring, and to thus give signals for the "motoring after stop" feature, for example.

Novel combinations of relay and amplifier contacts and timers actuate overheat malfunction circuits if the tailpipe temperature rises through a given range in too short a time, and other combinations provide manual or automatic throttle control, permit limiting of operation to a "motoring" condition where the engine is merely forcibly rotated but no fuel or ignition is introduced, and permit manual testing of a "launch thrust" circuit showing that launching thrust has been attained by the engine without going ahead with the other circuit operations for final actual vehicle launching.

When built to be used with an unmanned aircraft as mentioned previously, the final launching means, once the engine has reached take-off thrust, comprises a manual key-operated switch which starts a final fail-safe sequence of circuit operations for launching the craft and automatically separating it from all external connections, including the use of electrically powered disconnect plugs. When the Launch switch is actuated, all normal malfunction circuits are disabled, and no control is possible to stop the ensuing operation so that any other starter circuit or equipment circuit is unable to interfere with the last few seconds of launching operation.

In the accompanying drawings, shown by way of illustration and not limitation:

Figure 1 is a block diagram showing equipment and inter-connections between an aircraft engine and the automatic starter of the present invention.

Figures 2a through 2i are detailed circuit diagrams showing the entire starter console wiring, including connections to outside equipment such as electrically operated components in the aircraft. In Figure 2a is shown the control panel itself, with wiring connections indicated by corresponding letters on a plug P. In Figures 2b are shown four rotary sequence switches and their multiple-wafer wiring connections to the remainder of the starter. In Figures 2c and 2cc are shown a plurality of relays in the starter, with their contact connections indicated. Figure 2d shows four time delay relays and where they are connected into the starter system wiring. In Figure 2e are shown ten amplifiers in partial block and schematic form, with their operating interconnections. Figure 2f shows how a thrust converter is connected into the starter circuits. Figure 2g shows details of a power transfer unit used in the starter system. Figures 2h and 2i complete the starter wiring by showing a plurality of terminal connections and their outside-connected components.

Figure 3 is a perspective view of a typical rotary switch portion, showing the arrangement of driving components and a set of mechanically operated contacts thereof in the closed position when the switch is at rest.

Figure 4 is an elevation view of a portion of Figure 3, showing the contacts opened, just after the switch armature has been actuated.

Figure 5 is a schematic diagram of a typical signal amplifier used in the present invention.

Figure 7 is a schematic diagram showing the throttle control circuit of the starter console alone and in complete form, relay contacts being in the configuration causing the throttle to be in the "off" position.

Figures 8, 9, and 10 are simplified throttle circuit configurations representing "idle R. P. M.," "manual," and "automatic" conditions, respectively.

Figure 1:
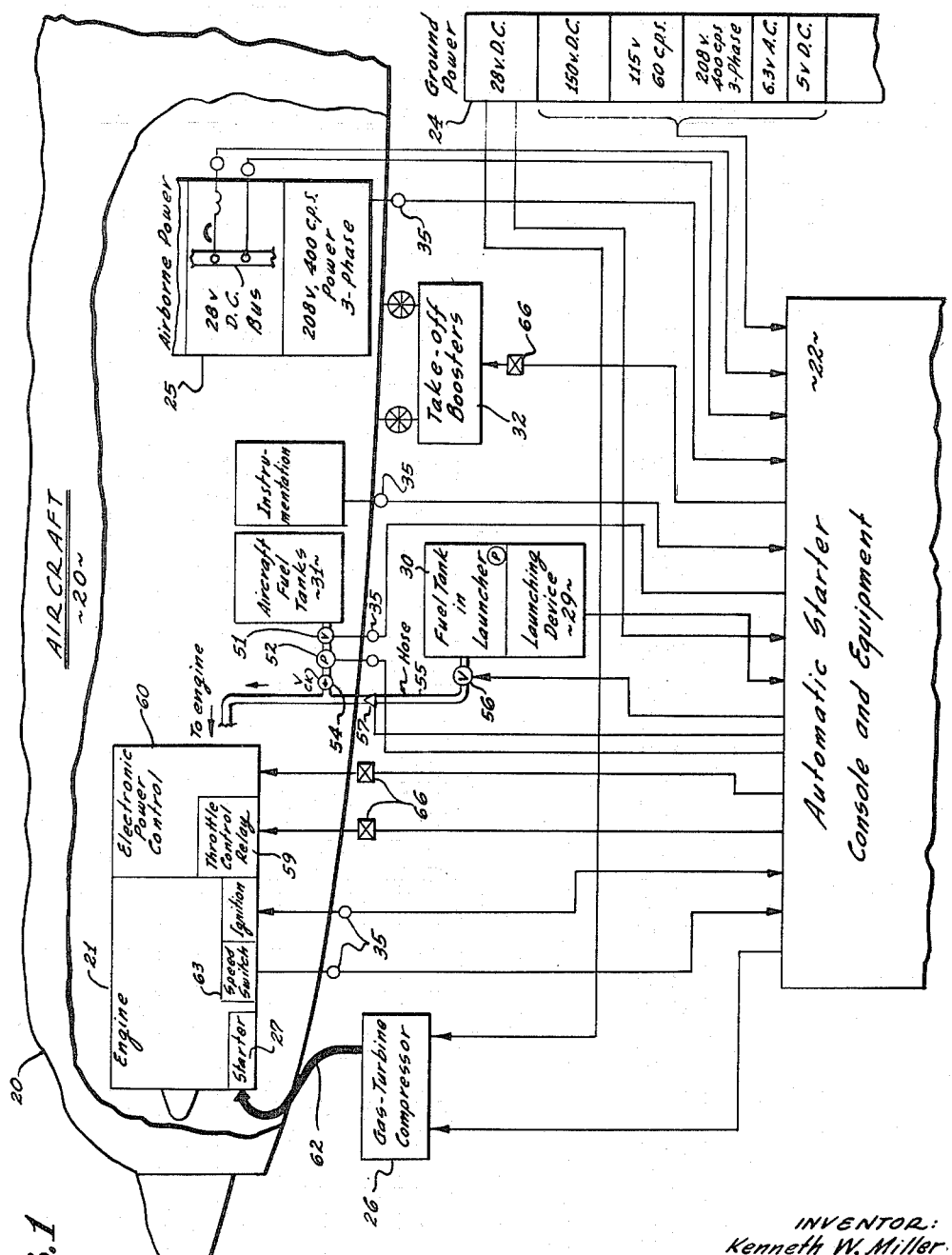

Referring first to Figure 1 for a detailed description of a specific embodiment, an aircraft structure 20 includes a jet engine 21 as a part thereof. An automatic engine starter console 22 is designated at the lower portion of the figure, from which various connections lead to the aircraft 20 and auxiliary equipment.

A ground power supply 24 furnishes electrical power of all required types to the starter console 22 for operation of electrical equipment. Airborne power 25 in the aircraft 20 is also used for certain circuits in the starter console 22 as will be described herein. A self-contained gas-turbine compressor unit 26 furnishes air under pressure to an air starter 27 of the jet engine 21.

In the case where the aircraft 20 is an unmanned vehicle, for example, a launching device 29 may be used, on which the vehicle rests. A fuel tank 30 in the launching device can be used to supply engine starting and running fuel prior to take-off, in order to conserve fuel in the aircraft fuel tanks 31. Also, booster rockets 32 may be employed and fired under control of the starter console 22 at the desired moment of launching.

Most of the electrical wires connected between the starter console 22 and the aircraft 20 are grouped and included in two main "umbilical" cables 34 (Figure 2h) which are connected by means of two electrically jettisonable plug connectors represented by a plurality of circles 35 in Figure 1. This type of connector is well known in the art.

Other aircraft components pictured in Figure 1 will be described as necessary when referring to the operation.

Figure 2A:
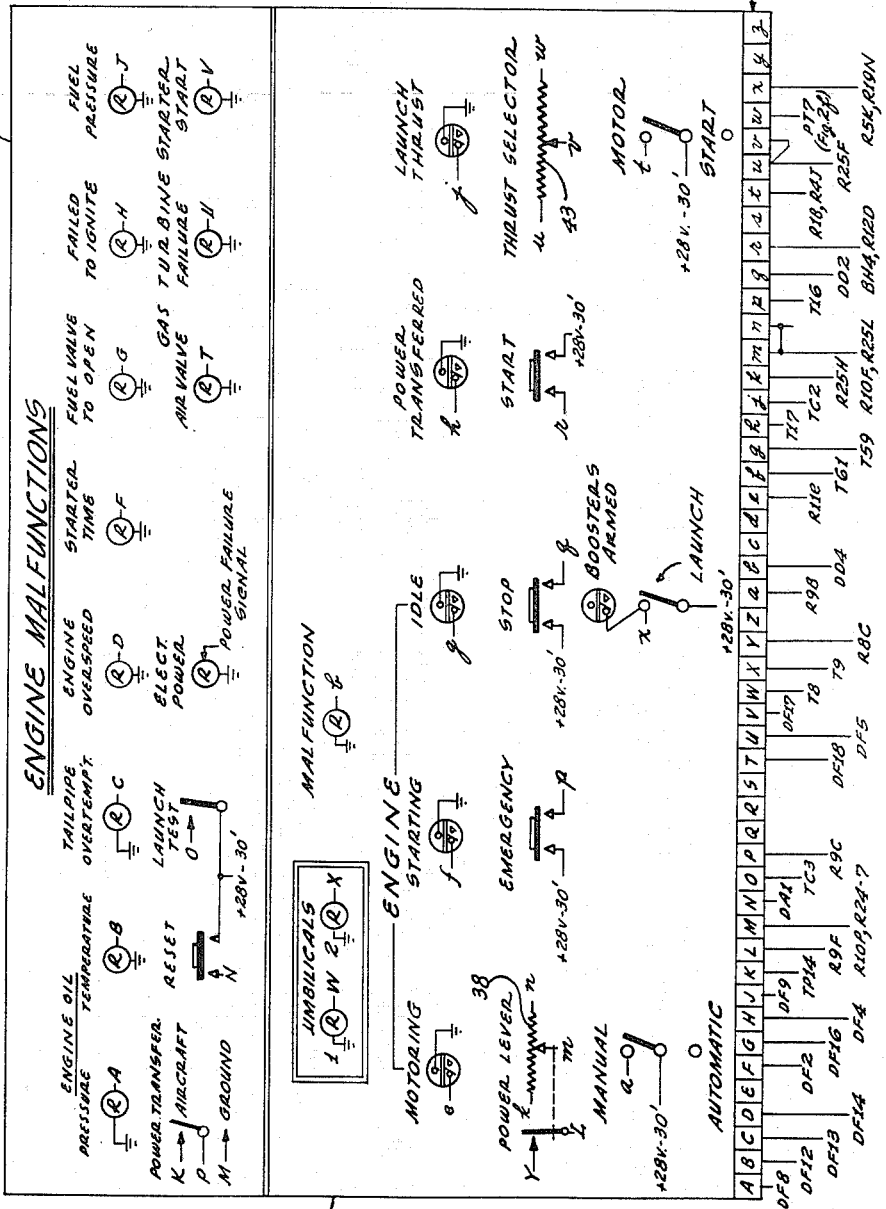

Figure 2a shows a control panel 36 of the starter console 22. It comprises various operating switches as labeled, and various indicator lamps, one set of such lamps being wired in appropriate individual circuits so that if and when a particular failure occurs, the corresponding lamp will light to identify that particular failure as such. One single Malfunction lamp also lights in the event of any of certain failures. Two lamps labeled Umbilicals, when lighted, indicate that their respective electrical connection cables 34 (of which there are a total of two) between the starter console 22 and the aircraft 20 are properly connected.

Three engine indicator lamps indicate respectively the operating condition of the engine, if it is in any phase except stopped. A Power Transferred lamp is lit when electrical power is transferred from the ground to the aircraft power supply. A Launch Thrust lamp is lit when the engine has reached a speed where its calculated and pre-set take-off thrust is being delivered. A Boosters Armed lamp, when lit, shows that the take-off rocket booster firing circuit is in the process of being energized.

Manual operating controls include a single-pole double throw Power Transfer switch with spring return to center off position, a Rest switch button spring-loaded open, a Launch Test button switch, a Power Lever potentiometer 38 for manual throttle control, an Emergency stop button, a normal Stop button, a Start button (the latter three being spring-loaded open), a calibrated Thrust Selector potentiometer 43 for setting the desired launching thrust to be obtained, a single-pole two-position Manual-Automatic switch for use depending on whether manual throttle operation or automatic throttle advance is desired, a Launch key-operated switch for initiating the final take-off or launching sequence, and a single-pole two-position Motor-Start switch for allowing a normal start or for restricting operation to a mere air motoring sequence for checking purposes.

Wiring connections from the panel components to a plug P are indicated by letters corresponding to the plug pins. In fact, the entire console wiring is indicated in this manner, wherein all necessary terminals and contacts are labeled, and the place to which each is connected by wire is shown by the individual characteristic symbol of that connected contact. For example P–L is pin L of plug P; DF8 is contact number 8 of the F wafer of rotary switch D; R9F is contact F of relay number 9; T17 is tie-terminal number 17; A3–2 is terminal number 2 of amplifier number 3; and so forth.

Figure 2b shows the segment arrangement of rotary switches which are mounted in and control the entire sequence of operation of the starter console 22. Three switches having rotary solenoid coils A, B, and C are identical, each having eight wafer sections on a switch shaft 37. These solenoids are 28-volt D. C. operated, as are all other D. C. relays in this equipment. Only seven wafer sections are actually used on rotary switch C. AA and AH are the front and rear wafers, respectively, of the A switch, for example. A fourth switch with a rotary solenoid coil D has four wafer sections in use.

Operation of these switches is in a conventional manner, wherein operating voltages applied to the solenoid A, for example (further shown in Figure 3), turns a driving armature 39 through a driving stroke which rotates the switch shaft 37 and associated wafers in one position in the clockwise direction. When voltage is removed from the coil, the armature 39 springs back through a return stroke ready to be actuated to turn the switch to the next position.

A set of commutating contacts 40 is provided on each of these units, which are mechanically opened by a plastic cam 41 contacted near the end of the driving stroke by a finger 42 attached directly to an armature-driven gear wheel 44, as shown in Figures 3 and 4. On the return stroke, which is accomplished by a spring (not shown), the finger moves through a substantial space between arms of the plastic cam 41 before moving the cam to the closed contact position at the end of the return stroke. Here, the contacts remain closed when the switch coil is idle.

Thus, by connecting the ungrounded coil lead to one side of the commutating contacts, and a supply lead 45 to the other side of the contacts, it is seen that a constant operating voltage applied on the supply lead 45 will cause the switch to rotate repeatedly by steps. This action is rapid, turning the switch through one step each 50 milliseconds, in a preferred embodiment. If operating voltage is removed from the supply lead when the switch has advanced just one position, it will remain in that adjacent new position, of course.

Connections between the commutating contacts 40 and the coil A are shown in Figure 3 as well as in the main schematic portion of Figure 2b. The A, B, and C switches have twelve positions, although there are effectively only six positions because of the double lobes (or gaps) 180° apart on the conducting segments of the wafers. Thus, each stroke of the A solenoid coil is designed to be 30°. All rotary switches are shown in the number one, or "home" position. Numbers on the wafer switches indicate the contact positions which are in actual use for this invention. To continue with the front wafer wiring, contact AB1 (the pole of the AB wafer) is connected to contact AA2, then through the commutating contacts 40 of the A switch. The B and C switches operate identical to the A switch. AA is the homing wafer, where it is seen that an operating voltage of +28 volts applied on the pole AA1 will cause the A switch to turn to the "home" position (if not already there) before the circuit is broken by a gap in segment AA coming opposite to contact AA1. This operation is fast enough so that no action will occur by the instantaneous closing of individual passing contacts on other wafers.

Further, it can be seen that if +28 volts is applied to AB11 when in the first position, a circuit is completed through AB1 and thence to the A solenoid to rotate all A wafers to the second position, close contact AB6, and open AB11. If AB6 is unenergized, the A switch will remain in the second position. This is how the rotary switches are advanced from one position to the next during sequential operation.

The D switch is rotated similarly, but it has 18 positions, a 20° stroke, and different contact arrangements. The D switching circuit contains normally open contacts R12J, R12K and normally closed contacts R19K, R19L in series between the D solenoid and contact DA14. Assuming for the moment that these series contacts are closed, it is seen that if a 28-volt signal appears on any one of the DA position contacts DA1 through 9, or on any one of the DB position contacts DB12 through 18, say DB12, the D switch will rotate by rapid steps to position 12 and stop there because the hot circuit is opened by the notch in the DB segment coming opposite to contact DB12. The pole of the DA wafer is the same as the pole of the DB wafer. The series contacts of R12 and R19 mentioned above are actually closed in normal operation of the starter system, and will be discussed later.

The action of this starter console 22, including the signalling of failures, is governed by the closing or opening of switches. Some switches are in amplifier output circuits, some in mechanically operated limit switch devices, and some in relay circuits.

Figure 2E:
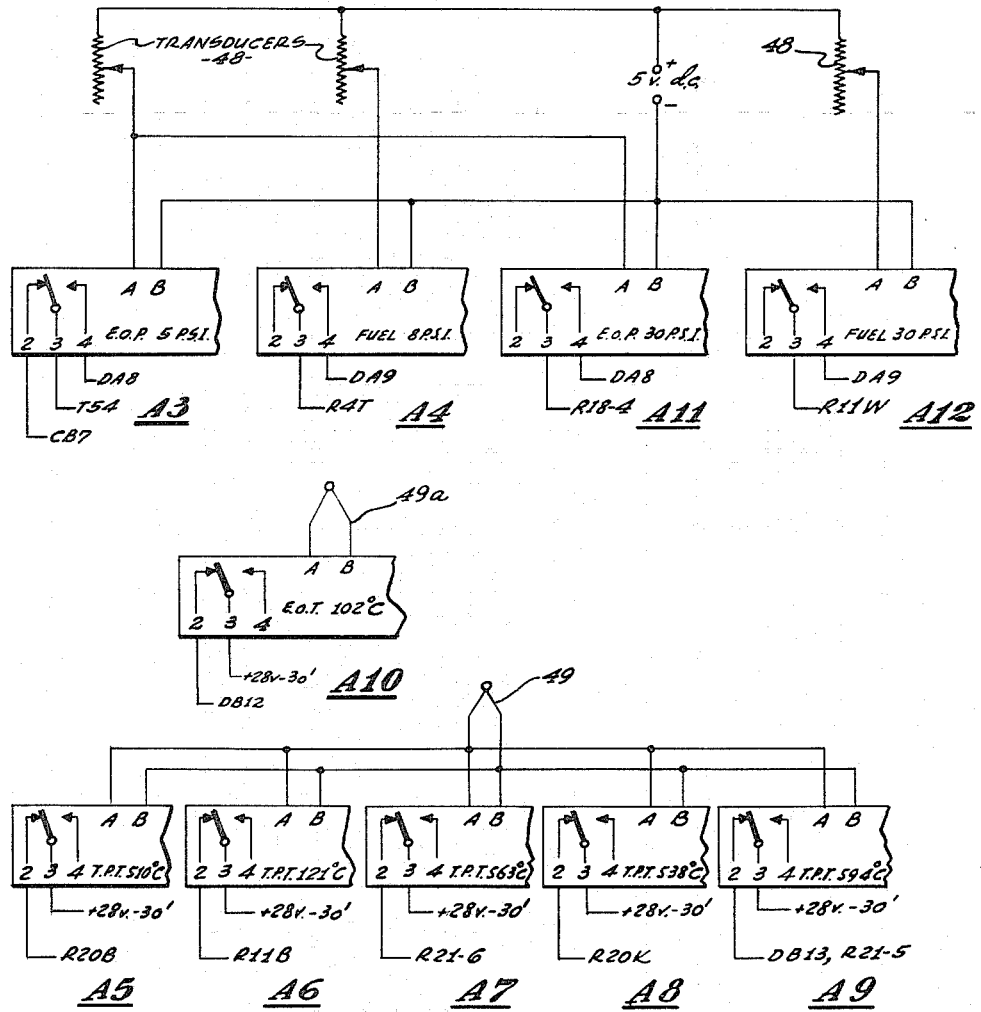

For the amplifier-operated switches, a transducer signal system is used, as schematically shown in Figure 2e, to provide an input signal voltage. In the case of fuel and oil pressures, a 5-volt D. C. power is supplied, with pressure transducers 48 which amount to resistances variable in accordance with the particular pressure with which each is associated. Their installation and operation are conventional and well known in the art. Thus, a D. C. voltage proportional to pressure is provided across terminals A and B of amplifiers A3, A4, A11, and A12.

A typical amplifier is shown alone in Figure 5. A gas triode tube 46 controls the actuation of an output relay 47 in accordance with the input signal level. The action of this amplifier is somewhat different from the normal amplifiers conventionally used for similar purposes. When turned off, the output relay 47 is of course de-energized. When the amplifier is turned on and warmed up, with zero volts input signal, the output relay 47 is energized. Then when the input signal voltage rises and reaches a value which is adjustable and indicative of a certain pressure to be transduced, the output relay 47 is caused to be de-energized again. If the input signal voltage subsequently lowers below the same critical value, it again energizes the relay. This is due to the polarity of the signal acting on the tube 46 and to the capacitor connected from anode to cathode of the gas tube 46. Output leads are taken from the relay contacts and connected in the desired control circuits.

In the case of amplifiers A5 through A9, in Figure 2e, a single thermocouple assembly 49 is connected to the five amplifiers in parallel, the amplifier relays being actuated at various degrees of engine tailpipe temperature, in accordance with a sensitivity control 50 connected in each amplifier circuit at pins 6, 7, and 8. This single thermocouple, or actually an assembly of a plurality of thermocouples arranged in the tailpipe to give an average temperature over several different positions, is capable of supplying a number of amplifiers because only an input voltage is used by the amplifier circuits. Another thermocouple 49a is used to transmit engine oil temperature information to amplifier A10. It may be desired, however, to use a different type of temperature transducer.

For engine speed-operated switches, used to cause certain starter console operations at various engine speeds, cam-operated limit switches outside of the starter console 22 itself are incorporated in the engine tachometer circuits, and the switch leads are connected into the starter system, as illustrated in Figure 2i, by L.S.1 through 6. Their operating mechanism is not a part of the present invention, although for an alternate system, R. P. M. voltage signals could be handled by amplifiers similar to the ones actually used in this embodiment.

Still other switches are closed by time delay relays. A 10-second timer TM4, 1.5-minute timer TM3, 5-minute timer TM2, and 30-minute timer TM1 are shown in Figure 2d. These are 115-volt A. C. motor-operated timers which close a set of contacts (connected in the regular 28-volt D. C. control circuits) after the A. C. energizing voltage has been applied for the required time. When the A. C. is cut off at any time, they reset to starting position immediately.

All other relays are of the ordinary type, and are shown in Figures 2c and 2cc.

One side of the 115-volt A. C. power supply, and the negative sides of the 28-volt D. C. and 150-volt D. C. power supplies are connected together at a common ground return, but the 5-volt D. C. transducer supply is maintained separate by itself and not grounded anywhere. Neither are the thermocouples tied in electrically with ground.

Before proceeding with a typical operation of the starter console 22, more information will be given on the particular fuel system devices used herein. As shown in Figure 1, a fuel outlet line from the aircraft fuel tanks 31 contains an aircraft fuel valve 51, booster pump 52, and check valve 54. This line is then joined by an auxiliary line including a fuel hose 55 coming from the launcher fuel tank 30 in the launching device 29, and including a launcher fuel valve 56. The fuel hose 55 is joined to the aircraft fuel line with an electrically ejectable coupling 57 which closes off the aircraft fuel line at this juncture when the fuel hose 55 is ejected. Fuel from the launcher fuel tank 30 has an outlet pressure a few pounds greater than the outlet pressure of the booster pump 52 in the aircraft 20, so that when in operation and the fuel hose 55 is connected, only fuel from the launcher tank 30 will be used, since the greater pressure at the outlet of the check valve 54 will keep it closed. Then as soon as the fuel hose 55 is ejected, or the launcher fuel valve 56 is shut, fuel will automatically be used from the aircraft fuel tanks 31. Launcher fuel pressure may be maintained by pump or preferably by compressed helium.

In this particular embodiment as shown, when all electrical power is first turned on, relays R6 and R16 (Figures 2cc and 2c) are immediately energized, and R12 is also now energized if the electrical "umbilical" cables 34 (see Figure 2h) are connected between the starter console 22 and the aircraft 20, but +28 volt control voltage is not yet available on all power bus bars. In the wiring drawing, points labeled +28 v. are now hot, such as contact R6J for example. The Start button (Figure 2a), however, is typical of a place not yet connected to power, so that pushing this button will have no effect.

Energizing R6 homes rotary switches A, B, and C by placing +28 volts on AA1, BA1, and CA1, so that the rotary switches are in starting position. Energizing R16 starts 30-minute timer TM1. During the 30-minute interval, amplifier tubes and all such equipment are raised to operating temperature. When the timer TM1 has run for 30 minutes, its contacts TM1-3 and TM1-4 are closed, thereby energizing relay R2 and holding it on by means of closed contacts R2C, R2D, R2F, and R2G. Therefore, contacts R2C and R2F are connected to +28 volts after 30 minutes. In the wiring drawings, points labeled +28 v.—30' mean that they are connected to contacts R2C and R2F, and are thus not supplied with operating voltage until R16 has been energized for 30 minutes. R24 is now energized through normally closed contacts R10N and R10P, and this will operate to transfer A. C. power-operated equipment from the aircraft power supply 25 to the ground power supply 24 if it was left connected to the aircraft power supply, as will be described later. R16 now becomes de-energized by the opening of normally closed contacts R2T and R2U, and R6 is de-energized by the opening of normally closed contacts R2K and R2L. R16 is ready for further uses requiring a 30-minute time delay, R6 is ready for energization if the Emergency stop button is pushed, and the entire starter system is ready for operation, with relays R2, R12, and R24 energized.

Figure 6:
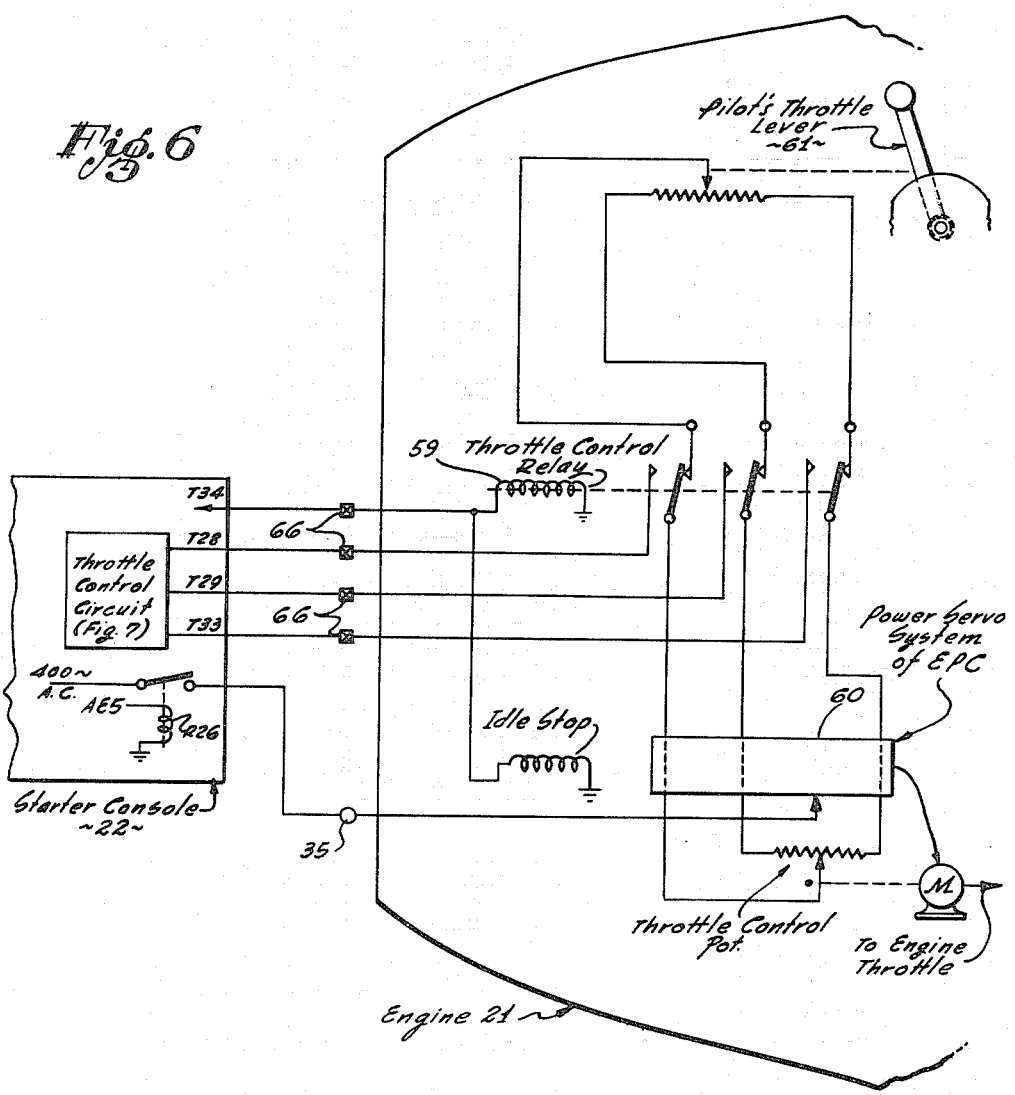
Figure 6 is a schematic diagram of a portion of the throttle control circuit, showing connections in the aircraft.

When R12 is energized, +28 volts are also supplied through contact R12S and terminal T34 to a throttle control relay 59 located in the aircraft as shown in Figure 6. Here, the throttle control relay 59 is energized to disconnect the throttle circuit control components in the aircraft and operatively connect the throttle circuit control components in the starter console 22, so that the engine throttle servo system of the electronic power control (EPC) 60 will be under control of the starter console 22 and not the aircraft throttle control system as represented by a pilot's throttle lever 61.

As an example of how the present starter system operates, a step-by-step functional procedure will now be given of the "automatic start" operation, assuming all power is on as described, and further assuming no failures. Malfunctions circuits will be described later, and thus only part of the entire action will be detailed at this point in the description.

First, the Manual-Automatic switch on the control panel 36 is placed in the Automatic position, and the Motor-Start switch is placed in Start. The two Umbilical lamps are lit, signifying that the electrical connecting cables 34 are connected. The Start button is now depressed manually and the starter console 22 operates as follows. Rotary switch A goes to position 2, by virtue of +28 volts being applied on AB11 through the Start button and closed contact BH7. Note that with switch A advanced from position 1, AB11 is now opened so that the rotary switch remains stopped at position 2, and in normal operation AB6 will have to be energized to turn the switch A further. Contact AE2 (which is interconnected with contacts AE3 through AE6) closes at position 2 and feeds +28 volts to terminal T2 to connect operating power to fuel booster pump 52 or pumps, to T4 to open the aircraft fuel valve 51, through CG1 to T14 to open the launcher fuel valve 56, and through AE5 to energize R26 and thus turn on the electronic power control (EPC) in the aircraft throttle control system as shown in Figure 6.

The throttle control circuit is thus put into operation, and its condition at this time is as shown in Figure 7, since no one of relays R8, R10, or R25 is yet energized. In Figure 7, the heavy lines show the extent of the effective circuit, and it is seen that the remainder of the throttle circuit lines are open. This position of throttle circuit components direct the EPC 60 to have the throttle closed or off.

This invention does not include the fuel valves and other such external equipment, of course, but merely provides control voltages to them. They are conventional electrically operated fuel valves as shown for example in Figure 2h, and have limit switches at the extreme end positions for breaking the circuit as is normal in automatic and semi-automatic equipment.

When the aircraft fuel valve 51 reaches the open position, +28 volts at T5 (from the valve "open" limit switch) is directed through the now closed contact AB6 to sequence switch A to position 3. Here, AD9 closes to light the Motoring lamp, through normally closed contact R11E. AF9 also closes to feed +28 volts from the valve "opened" signal on T5 through closed contact BB11 to step switch B to position 2, following the same stepping operation as described for switch A. BB11 of course then opens, and BB6 closes to prepare for the next stepping sequence when BB6 should be connected to power.

With rotary switch B in position 2, BC2 closes to energize T20 and thus give a starting signal to the gas-turbine compressor unit 26. The latter is a complete separate machine, one type of which is known in the art as a "Palouste," which furnishes air from a blower at a high flow rate and velocity for directing into the air starter 27 of the jet engine 21 via a flexible supply duct 62. This unit 26, or GTC as it may be called, has its own starting controls, such as latching type relays, separate power and fuel supplies and the like, so that only a temporary 28-volt input signal at the proper connection thereof is required to stop or start it, open its air delivery valve in the supply duct, and so forth. The flexible supply duct 62 is manually inserted and removed from attachment to the engine.

Figure 2F:
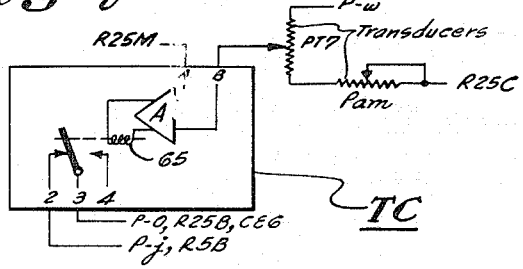
Figure 2H:
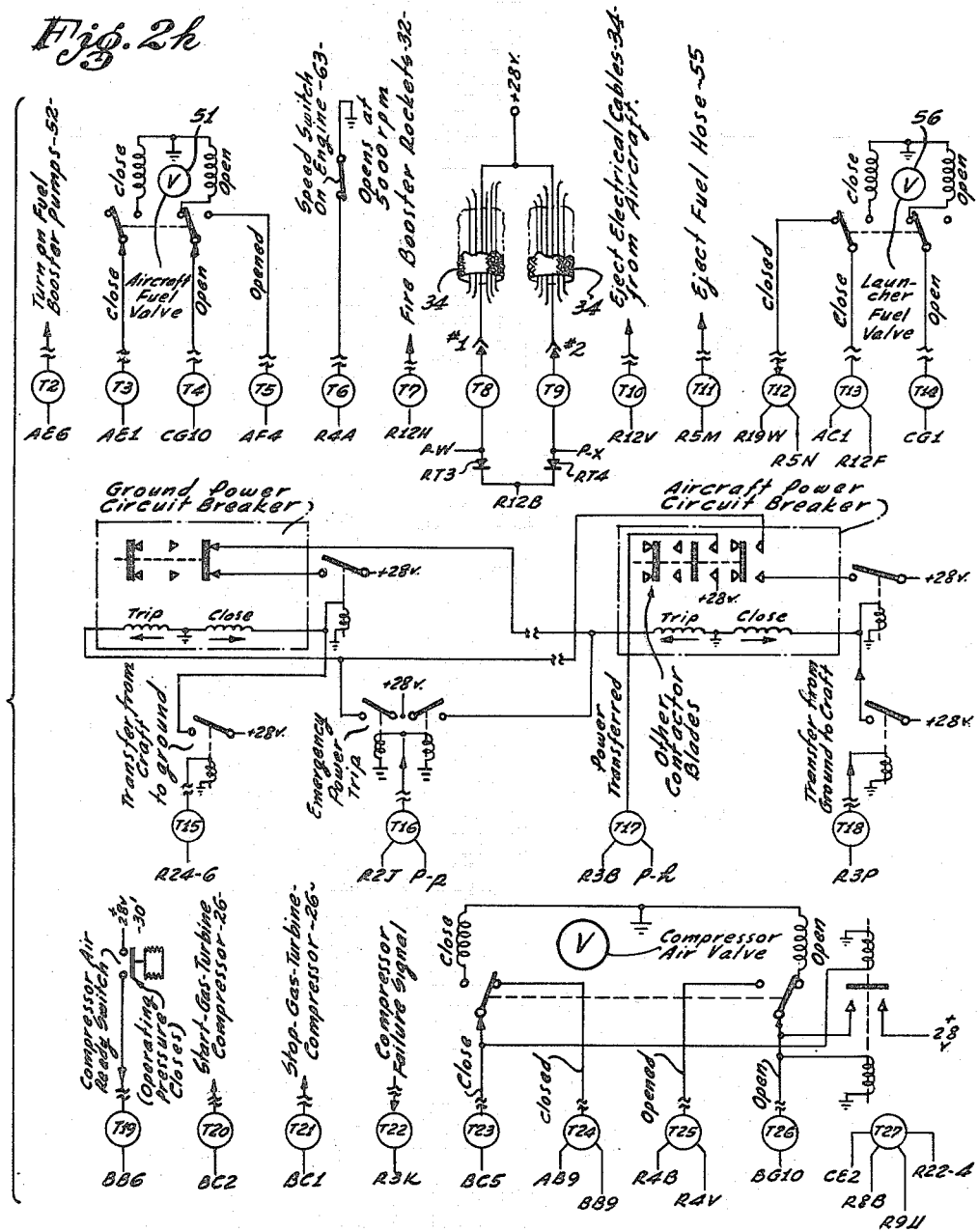

When the GTC has built up operating air pressure, a pressure-operated switch built therein closes and energizes T19 as shown in Figure 2h, and thus supplies +28 volt power to BB6 (now closed) to rotate switch B to position 3. Here, BG3 closes and opens the compressor air valve by energizing T26, the power coming through still-closed AF9 from the aircraft fuel valve "opened" signal on T5. Opening the compressor air valve of course directs an air blast into the engine starter 27 and accelerates the engine into motion. When the air valve has opened a 28-volt signal is received on T25 which energizes relay R4, and contact R4V closes and feeds +28 volts to BB7 (closed in position 3), which rotates switch B to position 4. With rotary switch B in position 4, BC4 closes, which feeds +28 volts through AH9 (closed since switch A is still in position 3), normally closed contact RIU, and CB11 to rotate switch C from position 1 to position 2, thus closing CC2 and lighting the Starting lamp. It will be noted here that if the Motor-Start switch had been placed in the Motor position, relay R1 would have been energized, opening the above mentioned contact RIU and thus preventing switch C from being rotated. In the case of the latter supposition, the engine would continue only as provided for the "motoring" phase, and the "starting" phase would go no further.

To continue with the automatic start, the engine is now still being accelerated by air power only, and when its speed reaches 800 R. P. M., limit switch L.S.1 (previously referred to) closes, allowing +28 volts through AD9, CC2, and L.S.1 to appear on T61 and therefore apply ignition to the engine. Still under air power only, the engine continues increasing speed, and at 1400 R. P. M., limit switch L.S.2 closes. Power through CD8 and L.S.2 energizes relay R10, and contact R10M closes to immediately energize R8, through CE2 (now closed) to R8B. Up to this time, the engine throttle has been closed, but with R10 and R8 energized, the throttle control circuit of the present invention assumes the configuration shown in Figure 8, and the EPC servo system in the jet engine is directed via terminals T28, T29, and T33 to open the throttle to its idling position. The throttle control circuit will be referred to in more detail later in this specification. Incidentally, energizing relay R10 also opened R10P which de-energized relay R24 and thus opened R24-4.

The jet engine is now starting to operate under its own power, and when ignition occurs and the tailpipe temperature reaches 121° C. (250° F.), contact A6-2 in amplifier A6 (Figure 2e) closes, relay R11 is thereby energized, and contact R11E opens to turn out the Motoring lamp. It will be remembered that the amplifier output contacts are illustrated in the non-actuated position, and that after warm-up and with no signal input they become actuated, and still later switch to the non-actuated position upon occurrence of the desired input signal strength—in this instance the input controls are set to cause the input signal to reach operating strength at a tailpipe temperature of 121° C.

Further, when R11 is energized, contacts R11S and R11V close to furnish a path for +28 volts to now-closed CB6, to thereby rotate switch C to position 3.

When engine speed reaches 5000 R. P. M., limit switch L.S.3 closes and feeds +28 volts from closed contact R11V through L.S.3, through closed amplifier contacts A3-3 and A3-2 to CB7 (now closed) to rotate switch C to position 4. In this case, A3-2 is closed since it is assumed that an engine oil pressure of at least 5 p. s. i. has been developed to create the necessary signal. With switch C in position 4, CC3 opens and thereby cuts off the ignition and extinguishes the Starting lamp. At the same time, CC4 closes and sends a +28 volt signal from AD9 (still closed) to terminal T23 to close the compressor air valve, shutting off the forced air supplied to the starter 27. Also at 5000 R. P. M., a mechanically operated speed switch 63 (Figures 1 and 2h) provided on the engine 21 (normally used for ignition cut-off) opens and thus de-energizes relay R4 (see terminal T6 in Figure 2h). De-energizing R4 merely de-activates certain of the starter overtime failure circuits and fuel pressure failure circuits previously usable if necessary.

Idling speed for the particular engine being started may be 7300 R. P. M., for example. When this speed is reached as called for by the throttle being at idle position, limit switch L.S.4 closes, and directs +28 volts from contact R10M (still closed) and closed contact CF10 through L.S.4 and the normally closed contact of L.S.5 (not yet actuated) to terminal T59 and thence to light the Idle lamp on control panel 36. Simultaneously, closing of L.S.4 also feeds +28 volts through normally closed contact R9E to contact TP–14 of the power transfer unit TP in Figure 2g. This unit functions to close the circuit to TP–15 at the correct instant as will be presently described, feeding the said +28 volts out and through closed contact R3P to T18 to transfer A. C. power from the ground power supply 24 to the aircraft A. C. power supply 25 which is now functioning by virtue of the fact that engine-driven alternators (not shown) are being driven. It will be noted that, before power was just transferred, +28 volts could not be directed from TP–15 through contact R24–4 to terminal T15, because R24–4 was opened as noted a few steps earlier.

The actual transfer of power can be accomplished, for example, by the external circuitry shown connected to terminals T15 through T18 in Figure 2h. Here, a signal on T18 causes the aircraft power circuit breaker to close and then the ground power circuit breaker to trip open. Thus, the two power systems are actually paralleled for an instant. It is evident that a subsequent signal on T15 would transfer A. C. power back to the ground by closing the ground power circuit breaker, which in turn would cause the aircraft power circuit breaker to be tripped open. These circuit breakers carry the heavy duty line contactors and other necessary contacts as partially indicated. Also shown is the switch contact for relaying a "power transferred" signal to the starter console via T17, to light the Power Transferred lamp, and to energize relay R3. This closes contact R3F and feeds +28 volts from T17 through CB8 (now closed) to rotate switch C to position 5.

At this point, describing the particular circuit herein illustrated, the engine now remains stabilized at the idling speed, until the Start button is manually depressed again. It is preferred to have the starter system operate in this manner. However, following the teachings already outlined, it would be a simple matter, if desired, to wire certain contacts at position 5 of rotary switch C so as to connect (1) into operating circuits for the next desired function automatically, or (2) into a time delay circuit for waiting at idling speed for a desired time interval and then automatically continuing.

Assuming now that the Start button is pressed for the second time, further automatic engine operation proceeds as follows. A 28-volt signal passes from the Start button through closed contacts R12C, R3C (closed when power was transferred), and CB9 to rotate switch C to position 6. Therefore, CE5 opens and R8 becomes de-energized. CE6 closes and the operating voltage connected through R10M and CE6 energizes relay R25, and is present at contact TC-3 of the thrust converter TC (Figure 2f). This latter contact is opened from TC-2 at this time as will now be explained. With R25 energized (along with R10 previously energized), the throttle circuit configuration is that which is shown in Figure 10, and which causes the EPC in the engine controller to move the throttle toward its full open position. Since the throttle servo system is now seeking a new null position, the electrical leads 64 to which the input terminals TC-A and TC-B of thrust converter TC are connected in series, will be reflecting an unbalanced condition, i. e., carrying a current which in this case is an alternating current from the A. C. operated servo motor system. This A. C. signal at the input of thrust converted TC, after being amplified and handled as desired, actuates a relay coil 65 therein which opens the circuit between normally closed contacts TC-2 and TC-3, as shown in Figure 2f.

Thrust converter TC is another type of signal amplifier used in the present invention. Basically, it comprises an input circuit adapted to the type of signal available, amplifier means, and a switch-type output circuit normally closed when no signal is present and open when a signal is applied.

As the engine now accelerates, it reaches and passes 7500 R. P. M., where limit switch L.S.5 is actuated, thus turning off the Idle lamp. The engine continues to accelerate to the speed required to give the selected take-off thrust, as set by the Thurst Selector control on the control panel 36. The particular R. P. M. satisfying this condition is also determined and affected by two transducers, Pam and PT7, as shown in Figure 10. These are similar to the transducers 48 shown in Figure 2e but in the form of potentiometers. The resistance of Pam in the circuit varies inversely with ambient pressure, and PT7 is placed at the tailpipe exit to vary in accordance with the outlet pressure at that point. For example, if outlet pressure increases, the tap of PT7 moves to the left in Figure 10, toward a reduced R. P. M. position. Ambient temperature also affects the pounds of thrust delivered at a given R. P. M., but this temperature also affects the ambient pressure, and it has been found that the thrust can be accurately calculated (and therefore produced) by using the two pressure variations only.

When the throttle opening reaches the position to give the selected take-off thrust, the throttle control circuit is balanced at a new null position where no current flows through the leads 64 which are connected to the input of thrust converter TC. This no-signal point is detected by the thrust converter which no longer can hold the relay coil 65 energized, and contacts TC-2 and TC-3 close, thus energizing R5 and lighting the Launch Thurst lamp. The starter console 22, jet engine 21, aircraft 20, and all equipment now stabilize ready for take-off, or launching, whenever the operator makes the final step of closing the Launch switch. Of course he will not operate the Launch switch until the Idle light has gone off and the Launch Thurst light has come on.

At the desired moment, the operator turns the keylocked switch labeled Launch. First, the Boosters Armed lamp comes on, and relay R19 is energized through the closed contacts R5J and R5K. R19M closes and feeds +28 volts through R5F and G, R12F and G (closed while umbilical cables 34 are connected), and T13 to send a signal out to start closing the launcher fuel valve 56. Next, when this valve is closed, but not until, +28 volts are directed back to the starter console through T12, and then (1) through R5N and M to T11 to eject the fuel hose 55 by means of the ejectable coupling 57, and (2) through R19W and V, R3V and W, to energize R13 which starts 10-second timer TM4.

At the end of the 10-second delay period, TM4-4 closes and feeds +28 volts through R19D and C and through R12W and V to T10 which is connected to the electrically jettisonable plug connectors 35, to thus eject the umbilical cables 34. The Umbilical lamps therefore go out, and relay R12 is de-energized by the disconnection of its actuating leads from the cables 34.

As R12 is de-energized, R12H closes, and the +28 volts existing on R5F (still closed) is fed out through T7 to the booster rockets 32, firing them. R5 is still energized to hold R5F closed because the output contacts of thrust converter TC are normally closed, and no throttle circuit unbalance voltage is now present to open them. The throttle control leads are not included in the umbilical cables 34 which were ejected. Just as R12 was de-energized, however, R12S was opened to de-energize the line through T34 to the throttle control relay 59, transferring throttle control to on board the aircraft 20. This merely disconnects all possible power from the input to thrust converter TC.

The aircraft 20 is now being launched under the combined thrust of its jet engine 21 and the booster rockets 32, and as it moves out, the throttle control relay wire, three throttle control wires, and one booster rocket wire are mechanically pulled out at snap connectors 66 shown in Figures 1 and 6. Now the aircraft 20 is separated from the starter console 22 and from the external limit switches previously mentioned. Therefore, the tachometer circuits are de-energized and limit switch L.S.2 opens, de-energizing relay R10 and consequently opening contact R10M. This deenergizes relay R5, thereby closing R5L and feeding +28 volts from the Launch switch through R12P (now closed of course) to AA1 where rotary switch A is homed to position 1 as previously described. When switch A is homed, switch B is homed by operating voltage through AD7 and R6L to BA1, and switch C is also homed by operating voltage through AC4, 5, and 6 (as switch A went through these positions during homing from position 3) to CA1. When switch B is homed as above, the gas turbine compressor 26 is stopped by a signal from BC1 through T21.

It is obvious with the rotary switches A, B, and C all homed, and all signals from the aircraft removed, that all relays and components of the starter console 22 will have been returned to the starting condition.

Thus, with the function of the starter console 22 fulfilled, it is ready to be hooked up to another aircraft or jet engine and repeat the process as desired.

Operating similarly, action of the present starter system when a manual start is made, is as follows, without going into detail. The Manual-Automatic switch is placed in the Manual position. This energizes relay R9. Action during starting will be the same as the "automatic" start until the engine reaches idling speed (7300 R. P. M. in this embodiment). Thereafter, A. C. power is transferable manually by operating the Power Transfer switch between the Aircraft and Ground positions as desired. Relay R3 will not be energized, and movement of the Power Lever control causes manual operation of the throttle to run the engine as desired between idle R. P. M. and full thrust R. P. M. The throttle circuit components are now in the configuration shown in Figure 9. At this condition, provision is made for testing the launching thrust condition of the engine by closing the Launch Test switch, which energizes relay R25 to open the throttle wide (as in "automatic") and sets up operation of the thrust converter TC to show by lighting the Launch Thrust lamp that the launching condition can be reached by the engine. The Launch Test switch may now be opened and the engine will be returned to manual operation where R25 is de-energized. This return, and hence a desirable "test" of the thrust converter and engine could not be made in the Automatic Start configuration of the console 22, since the Launch Thrust condition during that procedure is obtained only by pressing the Start button again, which advances switch C to position 6 for closing CE6, and the rotary switches cannot be backed up. It is seen that the Launch Test switch merely by-passes contact CE6.

After power has been transferred to the aircraft manually, pressing the Start button will sequence the starter console 22 and engine 21 to the position where unlocking the key-operated Launch switch will automatically accomplish the same functions detailed previously.

For motoring operation only, from the outset, the Motor-Start switch is placed in the Motor position, and the procedure is the same as the starting procedure detailed previously up to and including the point where the compressor air valve is opened. Relay R1 being energized by the Motor position of the control switch, rotary switch C is not permitted to advance to position 2. The engine merely motors under air pressure for 1.5 minutes, since energization of R4 had caused energization of R14 to start the 1.5-minute timer TM3 when the air valve "opened" signal had occurred on T25. After this time period has expired, contact TM3-4 closes to close a circuit to sequence contact BB8 and rotate switch B to position 5. Here, the GTC air valve is closed and the engine coasts down. The air valve closing rotates switch B to position 6, stopping the GTC unit and energizing R15 to start 5-minute timer TM2. After the 5-minute period, during which the engine has come to rest, TM2-4 closes and completes a hot circuit to AA1 to home switch A, where the fuel valves are closed and switch B is homed. This completes the motoring sequence operation.

At any time while the engine is operating, a normal stop can be accomplished by pressing the Stop button. If the engine is running at high speed, it is of course preferable to return it to idling condition for a few minutes, to allow it to dissipate internal heat gradually, before pressing the Stop button. This, in brief, rotates switch A to position 4 (from position 3), where switch C is homed and relay R15 is energized to start 5-minute timer TM2. With switch C at position 1, R10 is de-energized. With R10 de-energized, R24 is energized, transferring power back to ground if it has previously been transferred to the aircraft. De-energizing R10 also de-energizes R8, and the throttle is thus moved to the closed position, because the throttle circuit is in the configuration shown in Figure 7, the heavy lines indicating the extent of the effective circuit. The engine decelerates to a stop, and waits until the 5-minute period of timer TM2 has expired. At this time, switch A is rotated to position 5, which opens the compressor air valve and the engine motors under air pressure. With the air valve opened, R4 is energized, which energizes R14 to start the 1.5-minute timer TM3. After motoring for 1.5 minutes, switch B goes to position 5, closing the air valve. When the air valve is closed, switches A and B go to position 6, where (at position 6 of switch B) the GTC unit is stopped and R15 starts 5-minute timer TM2. After the 5-minute interval, during which the engine has coasted to a halt, contact TM2-4 closes and homes switch A, which in turn homes switch B, and the fuel valves are closed. This completes the normal stopping operation, and it should be noted that the starter console automatically stopped the engine and then automatically motored it for a given period under air pressure only, to put it in an absolutely safe condition.

At any time during operation of the engine, the Emergency stop button can be pushed, if the situation is serious enough to warrant such procedure. It can be seen that pushing this button energizes relay R6 and terminal T16, which immediately homes all three rotary switches, A, B, and C, and operates an emergency power trip which trips all A. C. power, but leaves +28 volt power connected to the console. Everything is thus shut down at once, including closing all valves, cutting ignition, closing the throttle, and stopping the GTC unit. The engine when stopped in this manner can thus be in a somewhat unsafe condition, but the procedure is designed for emergency use only, in case the need arises.

The automatic paralleling device used in the power transfer unit TP is shown in Figure 2g. This forms the subject of a copending patent application of Urban, Serial No. 509,031, filed May 17, 1955, now U. S. Patent No. 2,781,457, issued February 12, 1957. It comprises an input circuit having two resistors 67 and a glow tube 69 connected in series, the ends of this series combination being connected to respective voltages from similar phases of an aircraft power supply alternator (not shown) and a ground power supply alternator (not shown). Output across the glow tube 69 is rectified and filtered and fed to a first relay 70 to switch a condenser 71 between a charging position (terminal TP-9) and a discharging position across a transfer relay 72. Variable resistances or potentiometers 74 and 75 are included for adjustment.

The two alternator electrical systems have a common reference ground bond. The voltage appearing across the glow tube 69 will be maximum when the two alternators are 180° out of phase, and zero when in phase. As the voltage increases after passing an in-phase point, first relay 70 is actuated to allow condenser 71 to charge toward +28 volts existing on TP-F. Approach to the next "in-phase" point will allow first relay 70 to drop out and connect condenser 71 in a discharging circuit through transfer relay 72. If the charging time was long enough, transfer relay 72 will be actuated at the "in-phase" point and thus complete the circuit between TP-14 and TP-15, which in turn completes the circuit to either T15 or T18 (depending upon the condition of relays R3 and R24) when the power transfer signal is given to TP-14. Thus it is assured that the two A. C. systems are in phase at the time they are connected together momentarily while switching from one to the other.

Now that the manner of sequential operation of the various functions which are controlled by the starter console 22 is well in mind, attention is directed to a second important phase of the present invention: that of the malfunction circuits and their effect on the starter operation. It will be noted that in some of the operations as described herein, the sequence signal to be applied to a rotary switch to turn it to the next position had to come from a signal circuit showing that the previous operation called for had actually been carried out. This is one method the present invention uses as a safety measure.

For example, the first action of the console in starting the engine is to send a signal through AE2 to the "open" coil of the aircraft fuel valve 51. The next step was accomplished because this fuel valve actually opened and a limit switch therein closed a circuit to the next stepping contact of switch A. If the valve failed to open for any reason, no further starter action could occur, and thus no serious consequences would result.

At the same time as switch A was turned to position 2 where the valve opening signal originated, contact AD8 closed and thus energized relay R13 to start 10-second timer TM4. If the valve "opened" signal did not occur within 10 seconds, contact TM4-4 would close and feed +28 volts through R19E and BF7 to DB16, where this would rotate switch D from the home, or number 1 position, to position 16, as explained in the early portion of this specification. The wafer DD, through DD16, would thus carry a +28 volt signal to AA1 and home switch A to position 1. Further, contact DF16 would close and light the Fuel Valve Failed to Open lamp on the control panel 36. Thus, the console is returned to starting position, and the lighted failure lamp shows that is wrong. To proceed after the trouble has been corrected, the Reset button is pushed to home switch D to position 1, and the console is ready again to begin the starting procedure.

The same action will take place in a similar manner at the proper time if the GTC unit fails to build up operating air pressure within 1.5 minutes after being started, or if the GTC air valve fails to open within 10 seconds after receiving the signal to open, with the proper respective failure lamps being lighted. With the latter two failures, rotary switch B is also homed with power through AD7 and R6L to BA1, and switch C is still in position 1 so does not require homing.

Further along in the starting sequence, the following failures can occur and are provided for: failure to start within 1.5 minutes after the GTC air valve has opened, failure to ignite within 10 seconds after reaching 1400 R. P. M., GTC unit failure (other than valve or air pressure failure), engine oil pressure or fuel pressure failure, oil temperature too high, and engine overspeeding. These all affect starter action similarly, as follows. First, the respective timers (when appropriate) are energized at the selected time by operation of rotary switch contacts and sometimes also through normal relay contacts. If the specified failure does not occur, of course no malfunction circuits are energized although the timer relay output contacts may close, and the timer actuating relay is later de-energized by rotary switch contacts or intermediate normal relay contacts before it is time for any particular timer to be used again later, if so required, in the starting procedure.

If such failure as one of the seven enumerated just above does occur, the appropriate DA or DB contact is energized to rotate switch D to position 2, 4, 5, 8, 9, 12, or 14, depending upon which failure occurs. Here, wafer DF causes the proper failure lamp to be lit, and wafer DD sends +28 volts through R19G and H to AB7 to rotate switch A to position 4. Switch A is never moved to position 4 (except for homing through this position) unless and until a malfunction occurs or the Stop button is depressed. With switch A in position 4, switch C is homed to position 1 and relay R15 is energized to start the 5-minute timer TM2. After at least 1.5 minutes in position 4 (see next paragraph for further explanation), switch A will be rotated to position 5 through AB8. This, briefly, causes the same action as if the Stop button had been depressed. It is thus seen that the engine starting procedure is prevented from going any further after one of the foregoing malfunctions and that the engine is automatically stopped.

It will be noted that rotary switch A can be rotated to position 5 through two possible circuits. One is after a 5-minute time period, through TM2, R20X, and R4H, to AB8. The other is after a 1.5-minute time period, through TM3 and R4F, to AB8. The determining factor is the position of relay R4. If the compressor air valve is still open as during starting and R4 is thus energized, when a failure occurs, the 1.5-minute time circuit prevails, and both switches A and B are stepped to their number 5 positions simultaneously. This merely closes the air valve and lets the engine coast down to a stop without further re-motoring, since no re-motoring would be necessary for safety if the throttle had not yet been opened. However, if the compressor air valve is closed, the throttle open, and the engine operating faster than 5000 R. P. M., when the failure occurs, then relay R4 has been de-energized and the 5-minute time circuit prevails and is necessary before switch A can be rotated to position 5. In this case, the engine has stopped during the 5-minute interval beginning when switch A went to position 4, and switch B cannot yet be rotated to position 5. The compressor air valve is opened at the end of the 5-minute period, through the "aircraft fuel valve opened" signal line on T5, through AF11, R4L, and BG4, for a period of 1.5 minutes, and then switch B is rotated to position 5 to close the air valve. The latter course gives the automatic 1.5 minute re-motoring after a stop caused by a malfunction, the same as if the Stop button had been depressed. This explains the words "at least 1.5 minutes" used in the next preceding paragraph.

The only remaining malfunction circuits to be described are those forming the tailpipe temperature safety controls. During any actual operating or running state of the engine, say above 5000 R. P. M., it is automatically protected against excessive tailpipe temperatures as will now be described. At this time, therefore, relays R2, R10, R11, and R12 are necessarily energized. The positions of the rotary switches are immaterial.

First, suppose the tailpipe temperature should exceed 510° C. (950° F.) but not 538° C. (about 1002° F.). Amplifier contacts A5–3 and A5–2 therefore close, energizing relay R20, thereby in turn energizing R16 to start 30-minute timer TM1. After 30 minutes, if the tailpipe temperature is still above 510° C., +28 volts is fed through TM1–4, R20S, and R22–5 to DB13, where switch D rotates to position 13, and the engine is stopped as previously described for other malfunctions, unless the engine is running over 7500 R. P. M. If the latter is the case, relay R22 is also energized which opens R22–5 to prevent engine shutdown at this moment, and R22–4 is closed which energizes relay R8. It will be remembered that R8, when energized, always puts the throttle in idle position. This will slow down the engine and probably relieve the tailpipe temperature, in which event, relay R8 is de-energized below 7500 R. P. M., and the speed starts climbing again. However, if upon slowing down below 7500 R. P. M., the tailpipe temperature is still above 510° C., DB13 will be energized to stop the engine.

Second, suppose the tailpipe temperature should exceed 538° C. (1002° F.) but not 563° C. (about 1043° F.). Relays R20 and R16 are energized as before (at 510° C.), and, in addition, relay R15 is energized through contacts A8–2 and R20F, and relay R13 is energized through contacts A8–2, R20J, and R19U. The latter two relays start the 5-minute and 10-second timers, respectively. After 10 seconds at 538° C., TM4–4 closes and feeds +28 volts through R19E and R20M to energize R21. This opens R21–5 and prevents immediate stopping which would have occurred (through A7–2 and R21–5 to DB13) if the tailpipe temperature had risen from 538° C. to 563° C. in less than 10 seconds. Continuing at 538° C. for 5 minutes, TM2–4 would close to pass +28 volts through R20V and R22–5 to DB13 and thus stop the engine, unless again it is running at more than 7500 R. P. M. If over 7500 R. P. M., operation is as before, i. e., bringing down toward idle speed and then either speeding up again in case of sufficiently low tailpipe temperature or stopping the engine if still having excessive temperature below 7500 R. P. M.

Third, suppose tailpipe temperature exceeds 563° C. (1043° F.) but not 594° C. (1100° F.). Relays R20, R16, R15, and R13 are energized as before. If the 563° C. were reached in less than 10 seconds from 538° C., this would indicate too rapid a rise in temperature, since the engine would probably reach a maximum tailpipe temperature of 594° C. if permitted to continue. Therefore, reaching 563° C. before TM4 can operate to energize relay R21, allows +28 volts from A7–2 through R21–5 (normally closed) to DB13, which stops the engine regardless of speed. If the 563° C. were reached after more than 10 seconds from 538° C., TM4–4 is then in its closed position and R21 is energized, so that +28 volts is fed from A7–2 through R21–4 and R22–5 to DB13 to stop the engine if its speed is under 7500 R. P. M. If over 7500 R. P. M., the throttle is cut back to idle as previously described, where action is again the same below 7500 R. P. M., depending upon tailpipe temperature then.

In other words, the present starter console 22 treats some abnormally high temperatures as possibly being momentary transients only, and does not actually stop the engine unless it cannot be satisfactorily cooled by slowing the engine down and giving it a chance to "recuperate." Thus the starter automatically acts and controls the engine just as an operator would manually control it if he were reading and interpreting the tailpipe temperature indications correctly.

Fourth, if tailpipe temperature exceeds 594° C. (1100° F.) at any time, immediate stopping occurs by the feeding of +28 volts directly from A9–2 to DB13. In each case, stopping the engine through contact DB13 causes the Tailpipe Over-Temperature lamp to light and stay on.

Obviously, the particular temperatures and pressures referred to in this specification are given for purposes of example, only, and the important teaching to be realized is the action of the present starter console 22 in operating as it does at whatever temperatures may be selected to give the signals.

One more thing concerning the malfunction circuits is that they are all de-activated when the Launch keyswitch is operated to launch or take-off the aircraft 20. When relay R19 is energized upon operation of the Launch switch, contact R19H opens to prevent switch A from stepping to position 4 if the Stop button is pushed. Simultaneously, R19L opens in series with the operating solenoid of switch D and thus prevents this rotary switch from turning out of position 1 no matter what malfunction might occur at this time. Further, since the 10-second timer TM4 is to be used in this final sequence for launching, contact R19U opens to prevent a tailpipe over-temperature condition of 538° C. from actuating relay R13 through A8–2 and R20J.

Later in the final uninterrupted sequence, when the umbilical cables 34 are ejected, relay R12 is de-energized. Contact R12J thereof opens and acts as a double safety in series with R19L for preventing rotation of switch D. This explains the two series relay contacts mentioned in the early description of the D switch contact arrangement, and also points out the means for providing the final fail-safe launching sequence where no starter console circuit, external equipment circuit, or malfunction circuit can interfere with the launching operation once it is initiated.

Obviously, this starter console system is very versatile and susceptible of many changes and additions to what is actually shown herein. If the jet engine being started has an oil priming pump required to build up initial oil pressure for a constant-speed alternator drive, control of this pump can be easily incorporated in the starting circuits. For example, it could be started initially when rotary switch A goes to position 2, and stopped when switch C goes to position 3, or at any other time desired, or also restarted at a later time if required. Further, various electrical interlock circuits can be incorporated through the launching device 29 and starter console 22 in series with the Start button to prevent initial starting if certain necessary equipment is not properly plugged in.

Other equipment additions or various changes in operating sequence not even contemplated in this specification can be installed and accommodated according to the principles of the present invention, since there is no limit to the thoroughness of action and protection which can be achieved.

Complete instrumentation on the starter console 22 is or can be provided for all conditions needing visual indicators or for recording certain items being measured, without the use of extra wires from the aircraft or engine. Instrument panels are commonly provided, and the instruments are voltmeters 53 connected, for example, into the signal amplifiers as shown at terminal 5 in Figure 5, or they can be connected directly to the transducer outputs in Figure 2e.

Mention has been made that the present invention is not restricted to use with an unmanned aircraft such as a drone or guided missile, but can be used equally well in the case of a normal, piloted jet airplane or merely for starting and operating an engine by itself on a test stand, for example. For use with a piloted airplane, some differences should be pointed out. Of course the pilot will take off the aircraft, and the entire launching sequence components could be omitted from the console 22 or unused, including parts for the firing of any booster rockets, power-operated cable ejectors, and the like. The outside fuel tanks and controls for the valve thereof could be omitted.

If an electric or other different type of starter is used on the engine, the automatic console 22 will be wired to it instead of the separate gas-turbine compressor unit 26.

The automatic throttle circuit controls would still be used, however, and the throttle control relay 59 would switch control of the servo-motor of the EPC 60 between the starter console 22 and the pilot's throttle control lever 61. In this case, the engine would preferably be started under control of the automatic console, where manual run-up to any speed for any length of time could be accomplished. The engine would then be returned to idling speed and the pilot instructed to set his throttle lever at the "idle" position. Then the throttle control relay 59 would be de-energized and the pilot would have normal control. All operating connections between the aircraft and the starter console 22 could then be disconnected and the airplane would be free to operate normally.

Wherever the word "vehicle" or "aircraft" is used herein, it is not intended to limit the present invention to use with or for any particular secondary structure, since the vehicle can obviously be any machine using a gaseous combustion turbine, or "jet" engine.

It is thus seen that the present starter system automatically handles the jet engine during starting and running thereafter with the same actions as a perfect human operator or operators would do, under all conditions and in all eventualities. All the operator has to do is set the few controls for whatever type of operation is desired and push the Start button, assured that a rapid and safe procedure will result. This invention is extremely useful for the complicated jet aircraft engine systems now in use and for any future developments.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. Means for automatically starting a jet engine, comprising: a plurality of multiple-position control stepping switches each having a plurality of contacts closable at each respective position, electrically operated actuating means connected to each said control switch for advancing the respective switch one position each time when energized, said engine having a plurality of elements and equipment components to be operated in starting said engine, a plurality of means for operating said elements connected respectively through various position contacts of the said plurality of control switches in successive order of desired operation on each control switch, and sequence stepping means at each said control switch operable when a given desired condition is reached after operation of certain of said elements, to energize its respective switch actuating means and step its associated control switch to the next position wherein the next desired operating means is connected, said control stepping switches each having a "home" or "off" position where said elements concontrolled by that switch are connected to be turned off to a static condition as before starting of said engine, and including a homing contact and homing means at each said control switch whereby energization of said homing contact produces pulsed on-off energization of said actuating means for stepping that control switch until the home position is reached, automatic malfunction detecting means having output contacts closable upon occurrence of a specified malfunction and operatively wired to cause energization of said homing contacts of said control switches, whereby if said specified malfunction occurs, all said elements will be turned off to immediately cut off said engine.

2. Apparatus in accordance with claim 1 including an emergency manual switch effectively wired between a source of power and all control switch homing contacts in parallel, whereby said engine can be immediately cut off at will.

3. Automatic safety means for operating a jet engine, comprising: automatic sequence stopping control means connectable to said engine and including engine throttle positioning means, engine R. P. M. detecting means, and automatic overheat control means responsive to the tailpipe temperature of said engine comprising time delay and speed-controlled means connected to energize said stopping control means and stop said engine when said tailpipe temperature has exceeded a given value for a given time period at an engine speed below a predetermined R. P. M., and further time and speed-controlled circuit means connected to said throttle positioning means to reduce jet engine speed to idling R. P. M. when said tailpipe temperature has exceeded said given value for said given time period at an engine speed above said predetermined R. P. M.

4. In jet engine automatic starting and operating means wherein the engine has an electrical throttle control servo system: an automatic remote control throttle circuit and means for connecting the same into the servo system to form variable resistance control means therefore, said remote circuit comprising a plurality of resistances to be selected in different desired combinations including an off combination, an idling combination, and a full thrust combination, to simulate various positions of a throttle control member; relay-operated switching means connected between the several resistances for effecting said combinations; and engine speed-controlled switches connected in energizing circuits of said relay switching means for properly positioning the throttle of said engine during automatic progressive operation of said engine; said full thrust combination including a manually variable thrust selector resistance, a first transducer resistance variable in accordance with ambient atmospheric pressure, and a second transducer resistance variable in accordance with turbine outlet pressure in said engine; whereby a given selected take-off thrust value at said variable thrust selector resistance can be automatically attained by said engine in said full thrust combination during any of a range of ambient atmospheric conditions.

5. Automatic starter equipment for a jet engine-powered aircraft having a fuel tank therein, comprising: an aircraft fuel line from the aircraft fuel tank to the engine, means in the aircraft for pressurizing fuel in said line, a check valve in said line downstream from said pressurizing means, an external ground fuel tank, a ground fuel supply line from said ground tank connected to said aircraft fuel line between said engine and said check valve, a fuel shut-off valve in said ground supply line, ground means for pressurizing fuel in said ground supply line to a slightly higher pressure than in said aircraft fuel line upstream from said check valve, and means in said starter equipment for operating said shut-off valve.

6. Apparatus in accordance with claim 5 including an ejectable self-sealing coupling installed in said ground supply line at said aircraft, and means in said starter equipment for disconnecting said coupling to eject said ground supply line.

References Cited in the file of this patent

UNITED STATES PATENTS

| | | |
|---|---|---|
| 1,746,996 | Fairhill | Feb. 11, 1930 |
| 2,397,659 | Goddard | Apr. 2, 1946 |
| 2,470,564 | Lawrence et al. | May 17, 1949 |
| 2,541,805 | Berkey et al. | Feb. 13, 1951 |
| 2,579,617 | Schaevitz | Dec. 25, 1951 |
| 2,634,926 | Worlidge | Apr. 14, 1953 |
| 2,671,503 | Logan | Mar. 9, 1954 |
| 2,699,218 | Nims | Jan. 11, 1955 |
| 2,700,301 | Thomsen | Jan. 25, 1955 |
| 2,710,384 | Dupre et al. | June 7, 1955 |
| 2,741,086 | Machlanski | Apr. 10, 1956 |
| 2,746,247 | Bevins | May 22, 1956 |
| 2,759,802 | Potter et al. | Aug. 21, 1956 |
| 2,761,282 | Allen | Sept. 4, 1956 |
| 2,781,457 | Urban | Feb. 12, 1957 |
| 2,786,393 | Grimes | Mar. 26, 1957 |